(12) United States Patent
Nair et al.

(10) Patent No.: US 6,681,057 B1
(45) Date of Patent: Jan. 20, 2004

(54) IMAGE REGISTRATION SYSTEM AND METHOD IMPLEMENTING PID CONTROL TECHNIQUES

(75) Inventors: Dinesh Nair, Austin, TX (US); Lothar Wenzel, Round Rock, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/510,290

(22) Filed: Feb. 22, 2000

(51) Int. Cl.$^7$ ................................................ G06K 9/32
(52) U.S. Cl. ........................ 382/294; 382/190; 382/302
(58) Field of Search ................................. 382/294, 181, 382/190, 302; 700/83, 17, 18, 5, 7; 101/248; 713/600; 347/234, 116; 399/301

(56) References Cited

U.S. PATENT DOCUMENTS

| | | | |
|---|---|---|---|
| 5,901,199 A | 5/1999 | Murphy et al. | 378/65 |
| 6,121,992 A * | 9/2000 | Girmay | 347/234 |
| 6,185,402 B1 * | 2/2001 | Linssen | 399/301 |

OTHER PUBLICATIONS

Feedback Control of Dynamic Systems, Franklin et al., Copyright 1986 by Addison–Wesley Publishing Company, Inc., pp 95–111.

An Iteractive Image Registration Technique with an Application to Stereo Vision, Lucas et al., Computer Science Dept., Carnegie–Mellon University, Pittsburgh, PA, 1981, pp 674–679.

A Class of Algorithms for Fast Digital Image Registration, Barnea et al, IEEE Transactions on Computers, vol. C–21, No. 2, Feb. 1972, pp 179–186.

A Survey of Image Registration Techniques, Lisa Gottesfeld Brown, ACM Computing Surveys, vol. 24, No. 4, Dec. 1992, pp 326–376.

* cited by examiner

*Primary Examiner*—Anh Hong Do
(74) *Attorney, Agent, or Firm*—Meyertons Hood Kivlin Kowert & Goetzel, P.C.; Jeffrey C. Hood

(57) ABSTRACT

A system and method for improving the accuracy and convergence rate in determining the affine transformation of one image or array of values with respect to another image or array of values. A particular embodiment of the present invention comprises a reference and an input image. A gradient matrix, $\lambda$, may be constructed to contain gradient information of the position values of the reference image. Also, an estimate matrix, $\rho$, may be constructed to contain initial estimates of at least one of position, angle and scale of the input image. The input image is then subtracted from the reference image pixel by pixel producing an error matrix, e. The error matrix, e, is then multiplied with the matrices, $\lambda$ and $\rho$. The result is the new change in the position, angle and scale of the input image. New values for the position, angle and scale are calculated from the changes in the position, angle and scale values of the input image. These new values are substituted for the previous values of the input image. The input image is consequently transformed. The transformed input image is then subtracted from the reference image pixel by pixel forming a new error matrix, e. A new estimate matrix, $\rho$, is constructed from the previous estimate matrix, $\rho$, the error matrix, e, and the gradient matrix. The process is repeated until, e, is less than a given value. When that occurs, the correspondence between all points in the input and reference image has been determined.

58 Claims, 9 Drawing Sheets

A pair of images used for the registration example. The image in (b) is a shifted, rotated, and scaled version of the image in (a).

Response time of the control-based registration technique using the entire image.

Response of the registration of the images in Figure 2 using a P value of 5 for each of the affine parameters to be estimated.

IMAGE REGISTRATION SYSTEM AND METHOD IMPLEMENTING PID CONTROL TECHNIQUES

FIELD OF THE INVENTION

The present invention relates to the field of image registration, and more particularly to an image registration system implementing PID control techniques.

DESCRIPTION OF THE RELATED ART

In general, registration may be defined as the process by which the correspondence between two or more arrays of values is performed. Image registration may be defined as the process by which the correspondence between a subset or all points in two or more images, typically of the same scene, is determined. Image registration may also be stated as the process of estimating the affine transformation between the images. The affine transformation may be defined as the rotation, scale change, and translation that maps one n-dimensional image into a second n-dimensional image. In practice, n is usually 2 or 3. Image registration usually plays an important and critical first step in applications involving the fusion of information from multiple modalities. Modalities refer to various sensor implementations to receive the images or array of values. For example, an input image may be received by a thermal camera; whereas, a reference image may be received by a regular camera. An input image may exhibit an affine transformation with respect to the reference image.

Image registration may be used in image analysis tasks such as motion or change detection, fusion of data from multiple sensing modalities, and image geometric correction. There has been a tremendous increase in the need for good image registration techniques due to the increased use of temporal and multimodal 2-D and 3-D images in medical, remote sensing, and industrial applications.

Prior image registration techniques may have implemented some notions of feedback control systems. However, prior image registration techniques did not use PID (P-proportional, I-integration, D-differential components) control techniques to determine the affine transformation of one image with respect to another image.

Background of classical control systems is deemed appropriate. Control systems at the most basic level deal with a system that has a specific input which generates a specific output. The system could be a plant, an engine, a biological object, or any other structure with a clear input—output behavior. Inputs to the control system may be interpreted as control actions or noise sources. Outputs of a given control system mainly comprise measurements. These measurements describe internal states, which, in most cases, are not directly measurable.

In the simplest case, a so-called set point must be reached and stabilized based on appropriate control actions. Even in highly nonlinear situations, linear models can successfully be used to determine such control strategies. For example, the general continuous linear model $$\frac{dx(t)}{dt} = Ax(t) + Bu(t)$$

$$y(t) = Cx(t) + Du(t)$$

(1)

can be described by:
matrices A, B, C, and D
vector x(t) of internal states
vector u(t) of control actions
vector y(t) of measurements.

Additionally, noise terms can be added if necessary. The most successful and very common control strategy is simply a feedback according to:

$$u(t) = -K(t)x(t) \qquad (2)$$

The design of a valid control system mainly comprises the construction of matrices K(t) making the control system as efficient as possible. In typical applications the matrix K(t) is constant which simplifies the algorithms considerably.

Prior image registration techniques implementing notions of feedback strategies were deficient in that the convergence rate to determine the affine transformation was unsatisfactory. Therefore, an improved system and method is desired for performing registration, e.g. determining the affine transformation of an input image with respect to a reference image.

SUMMARY OF THE INVENTION

A system and method are provided for improving the accuracy and convergence rate in determining the affine transformation of one image or array of values with respect to another image or array of values. According to one embodiment of the present invention, the problem of finding the affine transformation parameters between the images or array of values to be registered is posed as a classical control problem using PID (P-proportional, I-integration, D-differential components) techniques. According to one embodiment, registration may be performed between an input array of values and a reference array of values. According to another embodiment, image registration may be performed between an input image and a reference image. An efficient registration or image registration may be performed by estimating the transformation between two subsets using a strategy based on a PID control system.

The present invention comprises a system, method and memory medium for improved registration, such as image registration. In a first embodiment, the system comprises a PID (P-proportional, I-integration, D-differential components) controller to accurately determine the affine transformation. Hence the PID controller may be used to determine the amount of rotation, shift and scale of an input image relative to a reference image. Both the reference and input image may be comprised of pixels and may be functions of position, angle and scale. In another embodiment, the PID controller may be used to determine the amount of rotation, shift and scale of an input array of values relative to a reference array of values. The reference and input array of values may both be functions of position, angle and scale.

In a particular embodiment, the reference image may be preprocessed by constructing a representation of the reference image, preferably a gradient matrix, λ, comprising gradient information of the position values of the reference image. The input image may be input to an image registration system.

An estimate may then be constructed comprising initial estimates of at least one of a position, angle and scale value of the input image. Preferably, the estimate is an estimate matrix, ρ.

The input image may then be compared with the reference image to determine if the input image has been shifted, rotated or scaled with respect to the reference image. More specifically, an error may then be calculated by subtracting the input image from the reference image. The error is preferably represented by an error matrix, e.

A comparison may subsequently be made between the error matrix and a given value. If the error matrix is less than a given value, then the correspondence between the input image and the reference image has been determined. Otherwise, the process continues by multiplying the error matrix, e, with the gradient matrix, $\lambda$, and the estimate matrix, $\rho$. The result of the multiplication is a new change in the position, angle and scale values of the input image. The input image is consequently transformed by replacing the old values of the position, angle and scale with the new values of the position, angle and scale. These new values are constructed from the changes in the position, angle and scale values of the input image. For example, $$X\text{new}=X+K^*\Delta X+Ki^*\int \Delta X+Kd^*d/dx(\Delta X)$$

$$Y\text{new}=Y+K^*\Delta Y+Ki^*\int \Delta Y+Kd^*d/dy(\Delta Y)$$

$$\text{angle new}=\text{angle}+K^*\Delta\text{angle}+Ki^*\int \Delta\text{angle}+Kd^*d/d\text{angle}(\Delta\text{angle})$$

$$\text{scale new}=\text{scale}+K^*\Delta\text{scale}+Ki^*\int \Delta\text{scale}+Kd^*d/d\text{scale}(\Delta\text{scale}).$$

The integral constant, Ki, is a steady state error correction parameter that is multiplied to the average of the previous values of the change in position, angle and scale. The derivative constant, Kd, is preferably a response parameter which may reduce the swings in the estimate values from being too high or too low. K is a constant that is multiplied to $\Delta X$, $\Delta Y$, $\Delta$ angle, and $\Delta$ scale. $\Delta X$ is the change in the value of X of the input image. $\Delta Y$ is the change in the value of Y of the input image. $\Delta$ angle is the change in the angle value of the input image. $\Delta$ scale is the change in the scale value of the input image.

The input image is transformed by replacing the old values of the position, angle and scale in the input image, with the new values. The transformed input image may then be subtracted from the reference image, providing a new error matrix, e. The estimate matrix, $\rho$, may also be updated using the error matrix, e, the current version of the estimate matrix, $\rho$, and the gradient matrix, $\lambda$. The process described is then repeated one or more times until the error matrix, e, is less than a given value. One the error matrix, e, is less than the given value, the affine transformation is determined to have been found.

To improve the convergence of finding the actual position, angle and scale values of the input image, appropriately valued constants, K, Ki and Kd are used. Appropriate values of K, Ki and Kd may be found by first receiving initial estimates of K, Ki and Kd. The reference image may then be rotated, shifted and scaled, producing a pseudo input image using a known affine transformation. The above registration method may then be used using the pseudo image as the above mentioned input image. Consequently, image registration may be performed between the reference image and the pseudo input image using PID control techniques as discussed above. Once the error matrix, e, is less than a given value, then appropriate values for K, Ki and Kd have been found for that iteration. These K, Ki and Kd values are known as candidate values.

After candidate values have been found, the reference image may be shifted, rotated and scaled to create a new pseudo image if the convergence rate of finding the actual position, angle and scale values of the pseudo image is unsatisfactory. Image registration may be performed again between the reference image and the new pseudo image using the candidate K, Ki and Kd values from the previously produced pseudo image. Image registration may also be performed using new initial values for K, Ki and Kd. Image registration between the reference image and the newly created pseudo images may be repeated one or more times until the convergence rate of finding the actual position, angle and scale values of the pseudo image is satisfactory.

Final K, Ki and Kd values result once the convergence rate of finding the actual position, angle and scale values of the pseudo image is satisfactory. Final K, Ki and Kd values may be produced after continually adjusting the candidate values of K, Ki and Kd from each iteration or a subset of iterations. Final K, Ki and Kd values may also be produced by taking an average of the candidate K, Ki and Kd values of each iteration instead of continually adjusting the values of K, Ki and Kd from prior candidate K, Ki and Kd values. The final K, Ki and Kd values are used in transforming the input image to approximate the reference image.

In a particular embodiment, a method for performing image registration between an input image and a reference image comprises a step of receiving the input image. The reference image comprises a first plurality of pixels. The input image comprises a second plurality of pixels, where the input image differs from the reference image by one or more of a position, angle and scale. The method further comprises the step of transforming the input image to approximate the reference image, where the transforming uses PID control techniques. Furthermore, transforming the input image produces a new input image. The method further comprises the step of calculating a difference between the new input image and the reference image resulting in an error. The steps of transforming the input image and calculating the difference are performed one or more times until the error is less than a given value. The method further comprises the step of generating an estimate in response to transforming and calculating the difference. The estimate comprises at least one of a position value, an angle value and a scale value which defines an affine transformation of the input image with respect to the reference image.

BRIEF DESCRIPTION OF THE DRAWINGS

A better understanding of the present invention may be obtained when the following detailed description of the preferred embodiment is considered in conjunction with the following drawings, in which.

DETAILED DESCRIPTION OF THE PREFERRED EMBODIMENT

The present invention comprises various embodiments of a system and method for performing registration, such as image registration. One embodiment of the present invention comprises a process of estimating the affine transformation of an input image with respect to a reference image. However, the present invention may be applied to various registration applications, such as performing registration between first and second data arrays, e.g., between an input array of values and a reference array of values. Examples of an input array of values and a reference array of values include sensor data arrays, such as image data (including 2-D and 3-D image data), audio data, sonar data, radar data, X-ray data, etc. The following describes one embodiment of the invention, comprising a system and method for performing image registration between an input image and a reference image. However, as stated above, the present invention may be readily applied to various registration applications.

Figure 1:
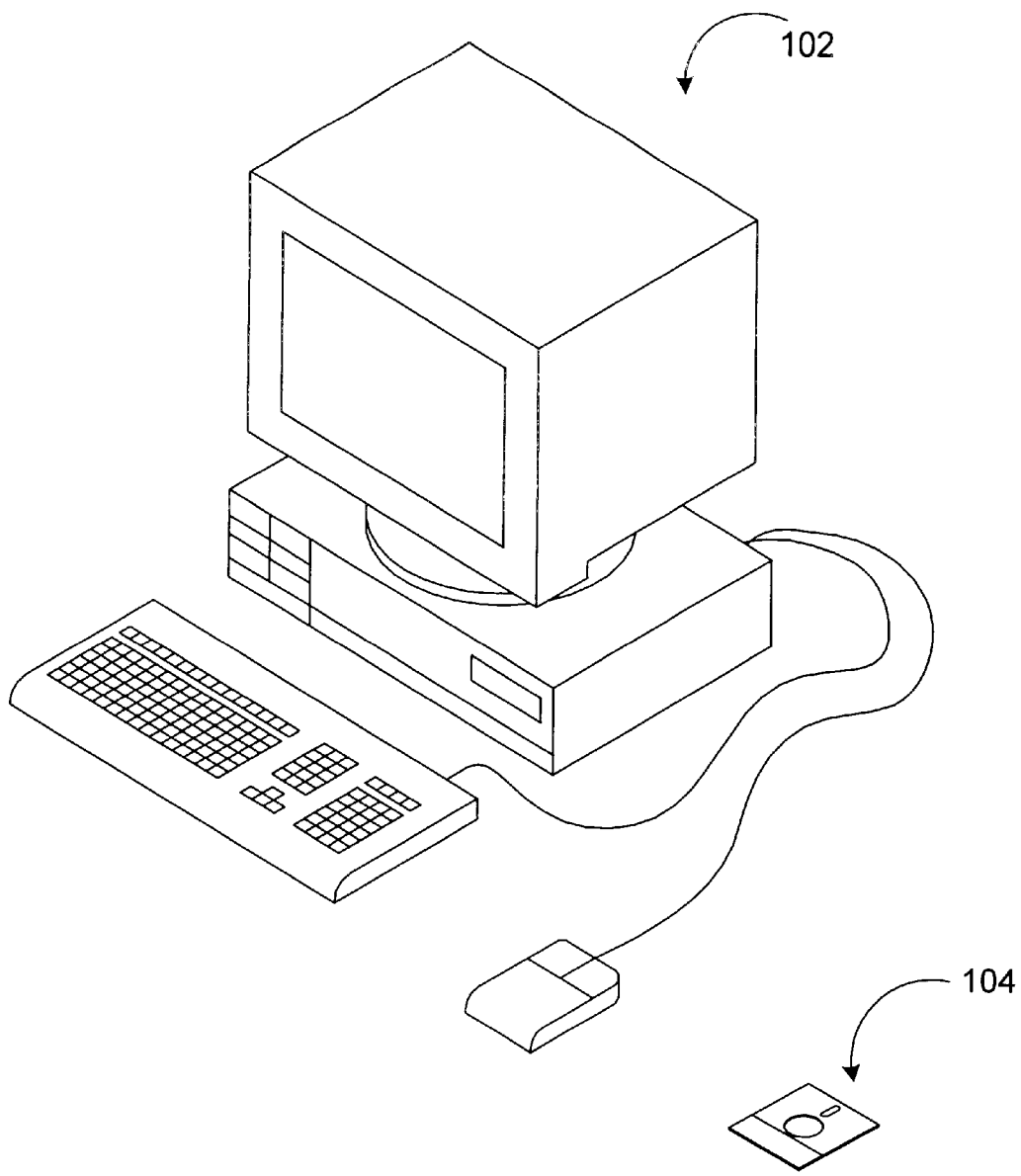
FIG. 1 illustrates a computer system which may be used for registration.

FIG. 1—Computer System

FIG. 1 illustrates a computer system 102 which may be used according to the present invention. The computer system 102 may comprise one or more processors, a memory medium, a display, and an input such as a keyboard or mouse, and any other components. The computer system 102 may be used, for example, to perform registration, which is the process of estimating the affine transformation of an input array of values with respect to a reference array of values. For example, the computer system 102 may be used to perform image registration, which may be defined as the process of estimating an input image with respect to a reference image. The reference and input images may be comprised of pixels, or pixel samples, which may represent values of an image. The pixels or samples may be received by a sensor element such as a CCD sensor element. A pixel may comprise one or more color values (or gray scale values) which represent the color or gray scale values at a given location in the image. As noted above, the present invention may also be used to perform registration between other data sets or other arrays of values, such as data generated by microphones, temperature sensors, sonar, radar, etc.

The present invention is preferably implemented by one or more software programs stored on a memory medium of the computer system and executed by a processor of the computer system. The term "processor" is intended to include various types of processors, CPUs, DSPs, microcontrollers, or programmable logic, among others. The term "memory medium" or "memory" is intended to include various types of memory or storage, including an installation medium, e.g., a CD-ROM, or floppy disks 104, a computer system memory such as DRAM, SRAM, EDO RAM, Rambus RAM, etc., or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution.

Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The software program according to an embodiment of the present invention may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired. A processor executing code and data from the memory medium comprises a means for performing image registration according to the methods or flowcharts described below.

Figure 2:
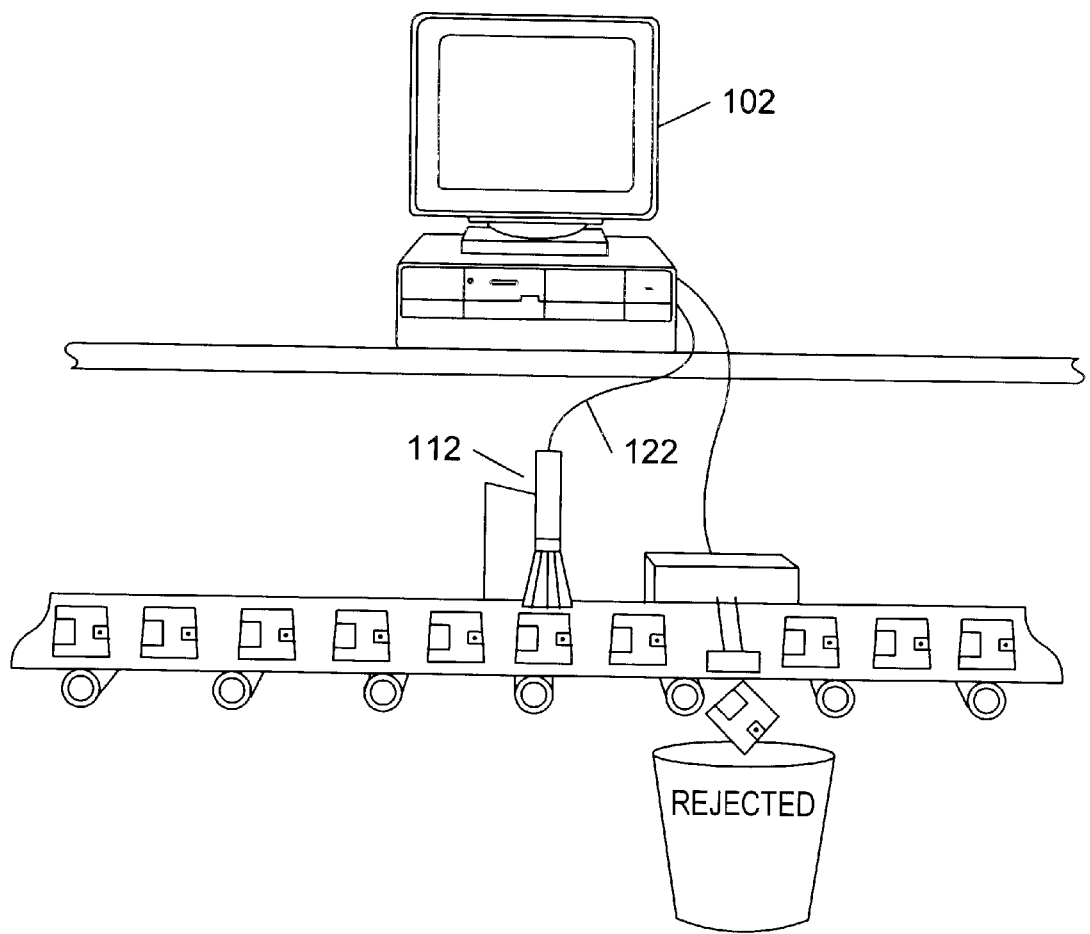
FIG. 2 illustrates an image acquisition or video capture system according to one embodiment.

FIG. 2—Machine Vision Application

FIG. 2 illustrates an example of a system where the present invention may be used. The image registration embodiment of the present invention may be used in various types of machine vision or imaging applications. For example, the computer 102 may be embodied in various form factors and/or architectures, e.g., a robot or embedded device, among others. It is also noted that image registration and any other techniques of the present invention may be performed in any of various manners, either in software, programmable logic, or hardware, or a combination thereof.

FIG. 2 illustrates an exemplary machine vision application, wherein the computer system 102 is coupled to a camera 112 via cable 122 and operates to receive an image and perform image registration. The computer system 102 of FIG. 2 may be programmed according to the present invention to perform image registration on an input image with respect to a reference image. The computer system 102 may also be programmed to characterize or represent a received image, e.g. both the input image and the reference image, with a fewer number of sample pixels, wherein the number of sample pixels is less than the total number of pixels in the image. This lesser number of sample pixels may then be used in the registration. This reduces the number of computations in the image registration.

Figure 3:
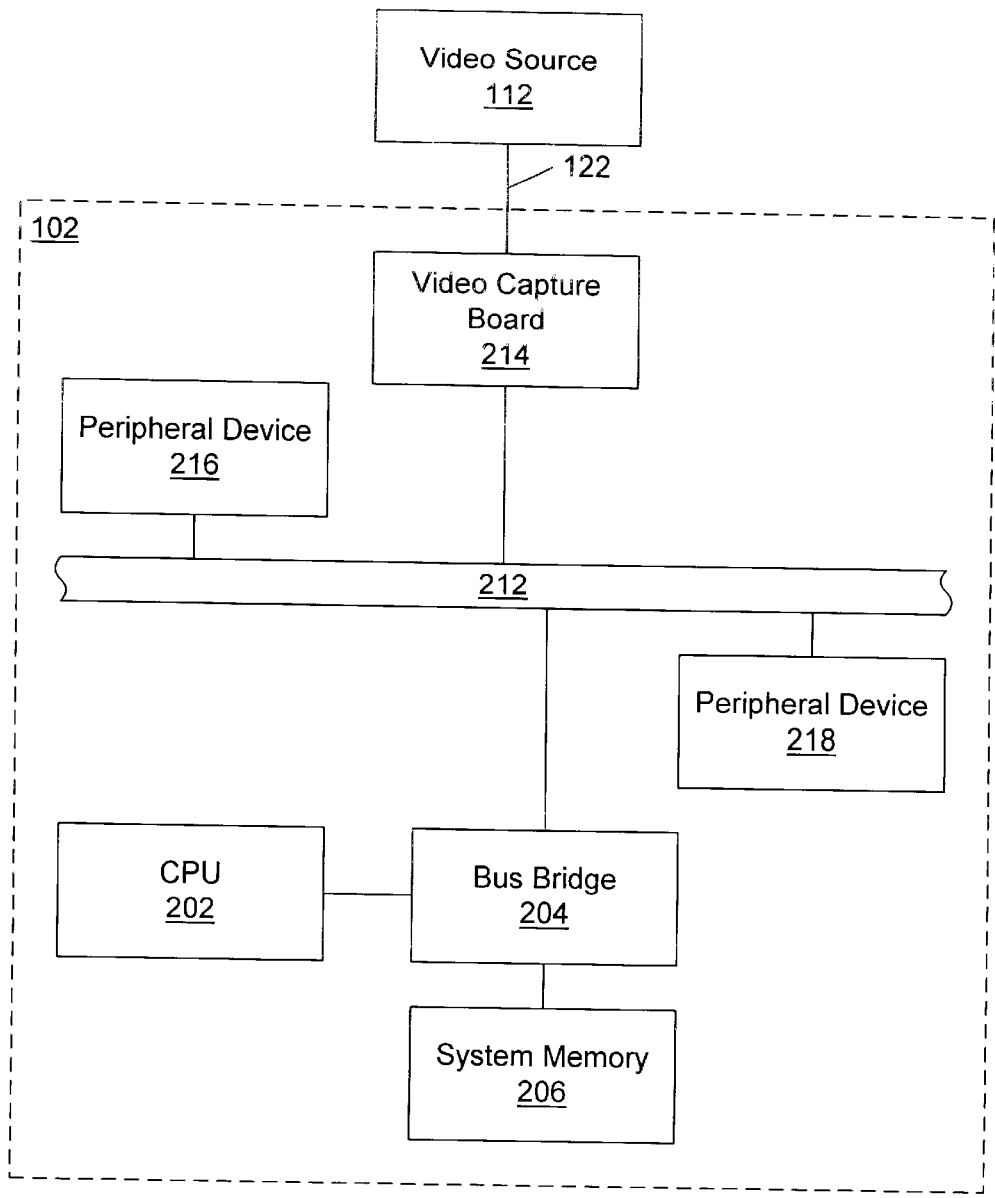
FIG. 3 is a high-level block diagram of the image acquisition system.

FIG. 3—Image Acquisition Block Diagram

FIG. 3 illustrates a high-level block diagram illustrating one system for acquiring an image for registration. It is noted that the block diagram of FIG. 3 is exemplary only, and other computer system architectures may be used as desired. The present invention may be implemented in a "smart camera", for example, which integrates a sensor, analog to digital (A/D) converter, CPU and communications devices together in a single unit. The present invention may be embodied in other devices, architectures or embodiments, as desired.

FIG. 3 illustrates the host computer 102 coupled to the video source 112 according to one embodiment. As shown in FIG. 3, the host computer 102 preferably comprises a CPU 202, a Bus Bridge 204, system memory 206, and a peripheral bus 212. The CPU 202 is coupled to the Bus Bridge 204. The Bus Bridge 204 is coupled to the system memory 206 and the CPU 202, and couples to the peripheral bus 212. In the preferred embodiment, the peripheral bus 212 is the PCI expansion bus, although other types of buses may be used.

In this embodiment, the host computer system 102 also includes a video capture board 214 which is adapted for coupling to the video source 112. The video capture board 214 is preferably coupled to the peripheral bus 212. In addition to the video capture board 214, other peripheral devices (216 and 218) may be coupled to the peripheral bus 212, such as audio cards, modems, graphics cards, network cards, etc.

The video source 112 supplies the digital video signals to the video capture board 214. The video capture board 214 transfers the digitized video frames to the system memory 206 through peripheral bus 212 and Bus Bridge 204. In this embodiment, the video capture board 214 acquires the target image and transfers the target image to system memory 206.

The system memory 206 may store an image or pattern, such as a reference image or sample pixels generated from the reference image. The system memory 206 also may store software according to the present invention which operates to determine the affine transformation of an input image with respect to a reference image.

The present invention is preferably implemented in one or more software programs which are executable by a processor or CPU. The software program(s) of the present invention are preferably stored in a memory medium, as described above, such as, system memory 206.

Figure 4:
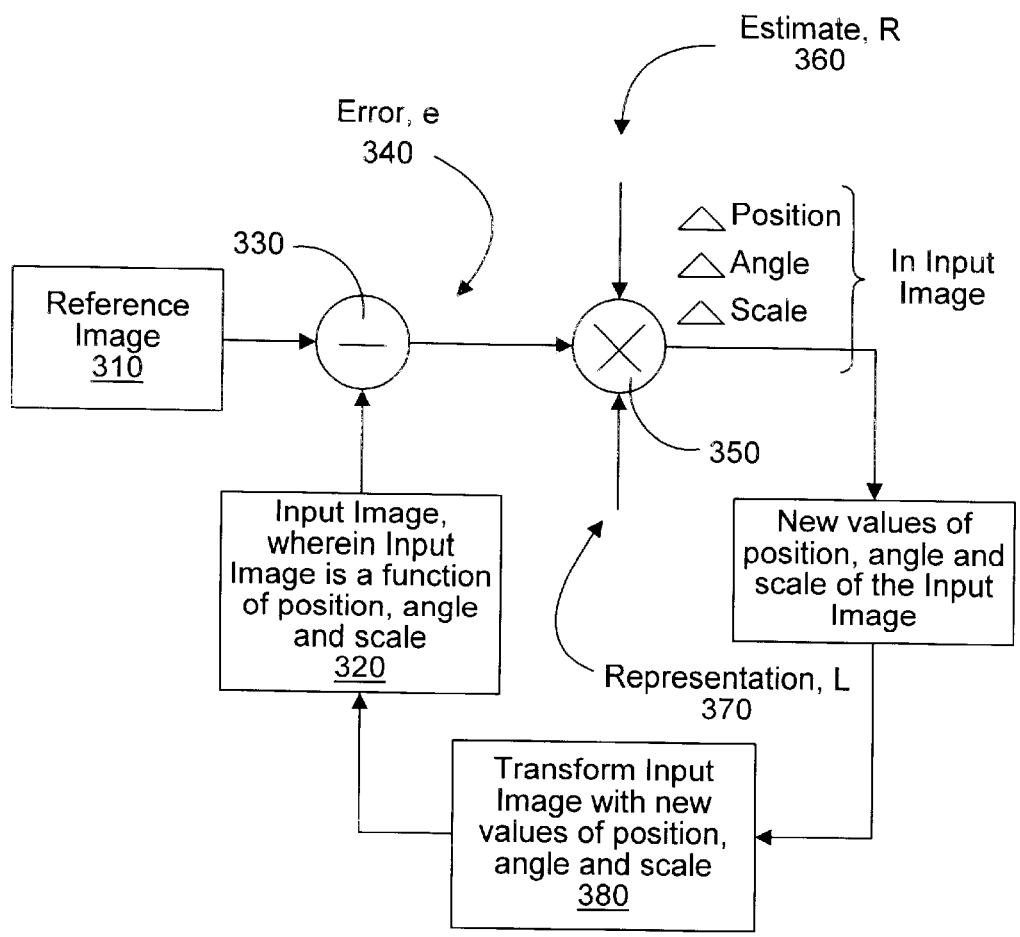
FIG. 4 is a block diagram illustrating the control structure of one embodiment of the present invention.

FIG. 4—Registration Block Diagram

FIG. 4 illustrates a control system for performing registration between two input data arrays. More specifically, FIG. 4 illustrates a control system embodiment for performing image registration between two images, an input image 320 and a reference image 310, where the input image 320 is a shifted, rotated, and scaled version of the reference image 310. Both the input and reference image may be functions of the four parameters x, y, $\theta$, and s (x-shift, y-shift, $\theta$-rotation, s-scaling factor). For example, given two reasonably sized regions, region A and region B, where region A is part of the reference image and region B is part of the input image respectively, region B matches region A with unknown values x, y, $\theta$, and s. The goal is to determine these values accurately. That is, the goal is to compute shift, rotation, and scaling values x, y, $\theta$, and s. The distance between region A and a shifted, rotated, and scaled version of region B (as part of the input image) is reduced with the aid of a step-by-step approach. The original situation may be described by an unknown x, y, $\theta$, and s.

The blocks in FIG. 4 may be implemented in various ways, such as a software program executable by a processor, such as a CPU, DSP, microcontroller, etc., or a hardware implementation, such as discrete logic, programmable logic such as a FPGA, and others, as well as combinations thereof.

In one embodiment, the method first comprises constructing a representation of the reference image. The representation of the reference image 310 may represent various features of the reference image 310, and may comprise a subset of pixels or values of the reference image 310. The representation may also be a gradient of the reference image. Preferably, the representation is a gradient matrix, $\lambda$ 370, comprising gradient information of the position values of the reference image. The position values may be the x and y values in a Cartesian coordinate system. Furthermore, the gradient matrix, $\lambda$ 370, may be stored in a memory in the computer system.

In one embodiment, in order to construct matrix $\lambda$ 370, the Prewitt derivatives of region A are calculated and these derivatives are then flattened, resulting in vectors Ix and Iy.

Then matrix $\lambda$ 370, which represents the position values of the reference image, may be constructed.

$$M_o = \begin{bmatrix} I_x & I_y & -yI_x + xI_y & xI_x + yI_y \\ \vdots & \vdots & \vdots & \vdots \end{bmatrix}$$

The matrix $\lambda = (M_0^T M_0)^{-1} M_0^T$ may then be calculated. The matrix $M_0^T M_0$ is 4×4 and non-singular (with exception of some pathological situations).

The method may then formulate initial estimates of the angle and scale of region B of the input image. The formulation or estimate may be represented by an estimate matrix, $\rho(\theta,s)$ 360.

$$\rho(\theta, s) = \begin{bmatrix} \cos(\theta)/s & -\sin(\theta)/s & 0 & 0 \\ \sin(\theta)/s & \cos(\theta)/s & 0 & 0 \\ 0 & 0 & 1 & 0 \\ 0 & 0 & 0 & \frac{1}{s} \end{bmatrix}$$

where (x, y, $\theta$, s) are the current estimates of the input image. The estimate, preferably represented by an estimate matrix, comprises at least one of a position value, an angle value and a scale value which defines an affine transformation of the input image with respect to the reference image. The estimate matrix, $\rho$ 360, may be stored in the memory of the computer system.

The error, e 340, may be calculated as the flattened difference (pixelwise) between region A and the shifted, rotated and scaled version of region B. Difference generator 330, operates to subtract region B of the input image 320 from region A of the reference image 310. The error, e 340, is preferably represented as an error matrix. The error matrix, e 340, may be stored in a memory of the computer system 102.

The new changes in the position, angle and scale of region B may then be calculated by multiplying the matrices $\rho$ 360, e 340 and $\lambda$ 370 using a transformer 350. The new changes in the position, angle and scale may be stored in a memory. Furthermore, new estimates of the position, angle and scale of region B may be constructed from the changes in the position, angle and scale of the input image. Hence, $[\Delta x, \Delta y, \Delta \theta, \Delta s] = \rho(\theta,s) * \lambda * e$ and $x_{new} = x + \Delta x$ $y_{new} = y + \Delta y$ $\theta_{new} = \theta + \Delta \theta$ $s_{new} = s + \Delta s$ That is, the new $(x_{new}, y_{new}, \theta_{new}, s_{new})$ version of region B may be calculated by effectively shifting the old region B by $(\Delta x, \Delta y)$, rotating it by $\Delta \theta$, and shrinking or stretching it by factor $\Delta s$ using bilinear or higher order interpolation. These new values of x, y, $\theta$, s replace the old values of x, y, $\theta$, s of the input image, transforming the input image. The new values of x, y, $\theta$, s transform the input image 320 to approximate the reference image 310.

The transformed image 380 is then subtracted from the reference image, repeating the above process until the error matrix, e 340, is less than a given value.

Figure 5:
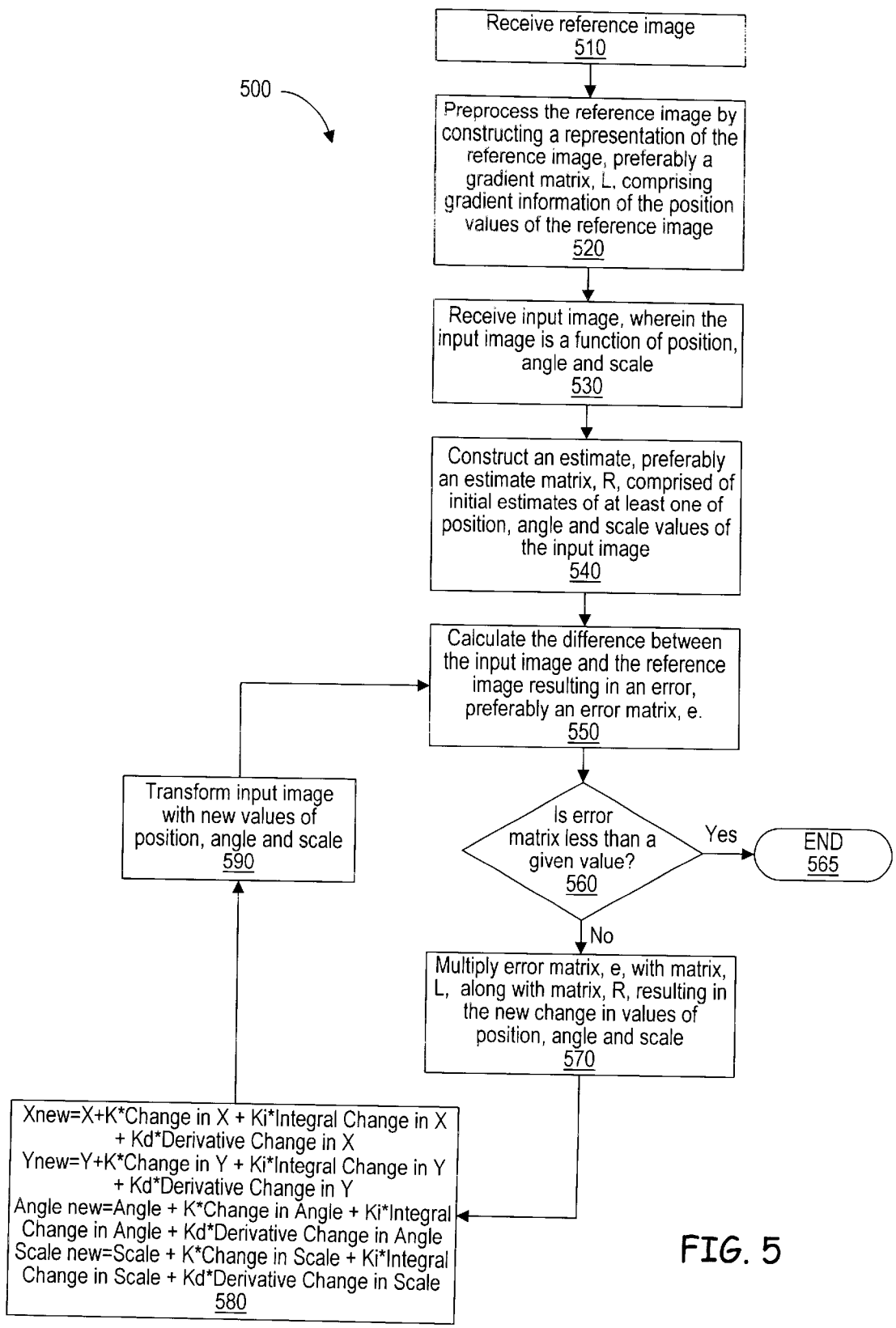
FIG. 5 is a flowchart illustrating the method of one embodiment of the present invention.

FIG. 5—Flowchart of an Embodiment of Present Invention

FIG. 5 illustrates an embodiment of the present invention that uses PID (P-proportional, I-integration, D-differential)

techniques to approximately determine the affine transformation between an input image and a reference image. It is noted that the steps in FIG. 5 may occur concurrently or in a different order. The method shown in FIG. 5 may be used to determine the amount of rotation, shift and scale of the input image 320 versus the reference image 310. It is important to note that the method shown in FIG. 5 may also be used to determine the amount of rotation, shift and scale of an input array of values versus a reference array of values. FIG. 5 describes one embodiment of the invention, comprising a system and method for performing image registration between an input image and a reference image.

In step 510, the reference image 310 is inputted to an image registration system. The reference image 310 may be comprised of pixels. Furthermore, the reference image 310 may be a function of position, angle and scale.

In step 520, the reference image 310 may then be pre-processed by constructing a representation of the reference image 310, such as a gradient matrix, $\lambda$ 370, comprising gradient information of the position values of the reference image. It is important to note that the representation of the reference image 310 may represent any of various features of the reference image 310. The representation may represent a subset of the pixels of the reference image 310. The representation may also represent a gradient of the reference image 310. Preferably, the representation represents a gradient matrix, $\lambda$ 370. The gradient matrix, $\lambda$ 370, may be stored in a memory such as in computer system 102.

In step 530, an input image 320 is input to the image registration system. The input image 320 may be comprised of pixels. Furthermore, the input image 320 may be a function of position, angle and scale. Later in step 550, the input image 320 will be compared with the reference image 310 to determine if the input image 320 has been shifted, rotated or scaled with respect to the reference image 310.

The transformed image 380 is then subtracted from the reference image, repeating the above process until the error matrix, e 340, is less than a given value.

FIG. 5—Flowchart of an Embodiment of Present Invention

FIG. 5 illustrates an embodiment of the present invention that uses PID (P-proportional, I-integration, D-differential) techniques to approximately determine the affine transformation between an input image and a reference image. It is noted that the steps in FIG. 5 may occur concurrently or in a different order. The method shown in FIG. 5 may be used to determine the amount of rotation, shift and scale of the input image 320 versus the reference image 310. It is important to note that the method shown in FIG. 5 may also be used to determine the amount of rotation, shift and scale of an input array of values versus a reference array of values. FIG. 5 describes one embodiment of the invention, comprising a system and method for performing image registration between an input image and a reference image.

In step 510, the reference image 310 is inputted to an image registration system. The reference image 310 may be comprised of pixels. Furthermore, the reference image 310 may be a function of position, angle and scale.

In step 520, the reference image 310 may then be pre-processed by constructing a representation of the reference image 310, such as a gradient matrix, $\lambda$ 370, comprising gradient information of the position values of the reference image. It is important to note that the representation of the reference image 310 may represent any of various features of the reference image 310. The representation may represent a subset of the pixels of the reference image 310. The representation may also represent a gradient of the reference image 310. Preferably, the representation represents a gradient matrix, $\lambda$ 370. The gradient matrix, $\lambda$ 370, may be stored in a memory such as in computer system 102.

In step 530, an input image 320 is input to the image registration system. The input image 320 may be comprised of pixels. Furthermore, the input image 320 may be a function of position, angle and scale. Later in step 550, the input image 320 will be compared with the reference image 310 to determine if the input image 320 has been shifted, rotated or scaled with respect to the reference image 310.

In step 540, preferably prior to the comparison, an estimate is constructed comprising initial estimates of at least one of a position, angle and scale value of the input image 320. Preferably, the estimate is an estimate matrix, $\rho$ 360. The matrix, $\rho$ 360, may be stored in a memory such as in computer system 102.

In step 550, the difference between the input image and the reference image is calculated resulting in an error, preferably an error matrix, e 340. The input image 320 may be subtracted from the reference image 310 pixel by pixel resulting in an error matrix, e 340.

In step 560, a comparison is made between the error matrix, e 340, and a given value. If the error matrix, e 340, is less than a given value, then the correspondence between all points in the input image 320 and reference image 310 has been determined. If the error matrix, e 340, is less than a given value, then the process ends at step 565.

If the error matrix, e 340, is greater than a given value, then the process continues by transforming the input image. In order to transform the input image, the error matrix, e 340, is multiplied with the matrix, $\lambda$ 370, and the matrix, $\rho$ 360 in step 570. The result of the transformation is a new change in the position, angle and scale values of the input image 320. The new change in the position, angle and scale values of the input image 320 may be stored in a memory such as in computer system 102.

In step 580, new values of the position, angle and scale of the input image 320 are constructed from the changes in the position, angle and scale values of the input image 320. For example, $X$new=$X$+$K$*$\Delta X$+$Ki$*$\int \Delta X$+$Kd$*$d/dx(\Delta X)$ $Y$new=$Y$+$K$*$\Delta Y$+$Ki$*$\int \Delta Y$+$Kd$*$d/dy(\Delta Y)$ angle new=angle+$K$*$\Delta$angle+$Ki$*$\int \Delta$angle+$Kd$*$d/d$angle($\Delta$angle)

scale new=scale+$K$*$\Delta$scale+$Ki$*$\int \Delta$scale+$Kd$*$d/d$scale($\Delta$scale).

The integral constant, Ki, may be referred to as a steady state error correction parameter which reduces steady state errors. The derivative constant, Kd, may be referred to as a response parameter, which increases the response times. Kd is preferably a response parameter which may reduce the swings in the estimate values from being too high or too low. K is a constant that is multiplied with $\Delta X$, $\Delta Y$, $\Delta$ angle, and $\Delta$ scale. $\Delta X$ is the change in the value of X of the input image. $\Delta Y$ is the change in the value of Y of the input image. $\Delta$ angle is the change in the angle value of the input image. $\Delta$ scale is the change in the scale value of the input image. The manner in which K, Ki and Kd are derived is discussed further below.

In step 590, the input image 320 is transformed by replacing the old values of the position, angle and scale in the input image 320, with the new values. Transforming the input image can comprise rotating a stage to visualize the different regions of the input image when the input image was positioned on a stage. In step 550, the transformed input image 380 is then subtracted from the reference image 310, providing a new error matrix, e 340. The estimate matrix, ρ 360, is also updated using the error matrix, e, the current version of the estimate matrix, ρ 360, and the gradient matrix, λ 370. Steps 550, 560, 570, 580 and 590 are repeated one or more times until the error matrix, e 340, is less than a given value in step 560.

Figure 6:
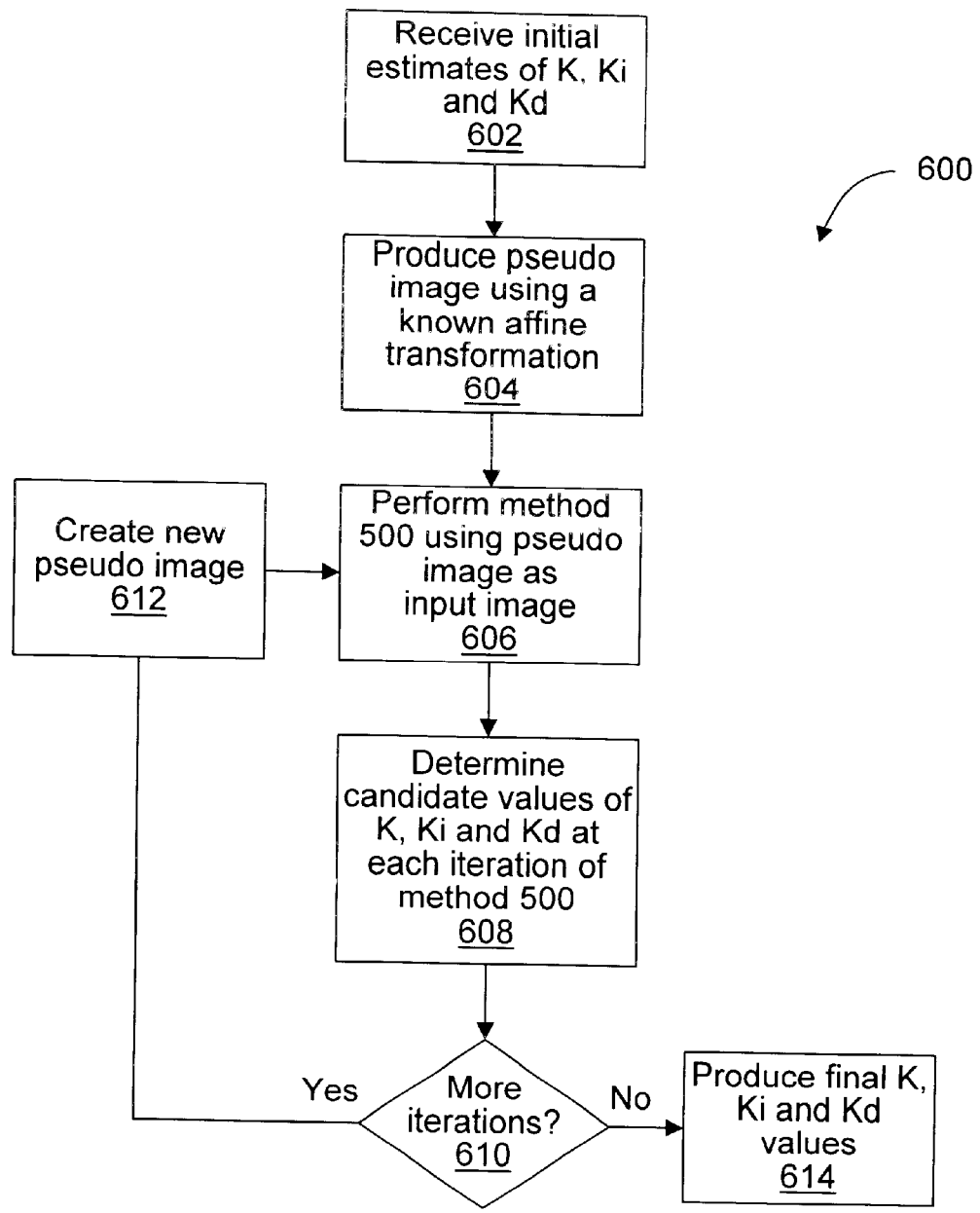
FIG. 6 is a flowchart illustrating the method of one embodiment of the present invention of determining appropriate constant values in a PID controller.

FIG. 6—Flowchart of Determining Values of K, Ki and Kd

To improve the convergence of finding the actual position, angle and scale values of the input image 320, appropriately valued constants are used. These constants may be used in determining the new values of the position, angle and scale of the input image 320 from the changes in the position, angle and scale values of the input image 320. Again, the new changes in the position, angle and scale values of the input image 320 may be constructed from the multiplication of the error matrix, e 340, the gradient matrix, λ 370, and the estimate matrix, ρ 360. These new changes in the position, angle and scale values of the input image 320 may be stored in a memory of a computer system. As noted above the new values for the position, angle and scale of the input image 320 may be the following:

$$X\text{new} = X + K^* \Delta X + Ki^* \int \Delta X + Kd^* d/dx(\Delta X)$$

$$Y\text{new} = Y + K^* \Delta Y + Ki^* \int \Delta Y + Kd^* d/dy(\Delta Y)$$

$$\text{angle new} = \text{angle} + K^* \Delta\text{angle} + Ki^* \int \Delta\text{angle} + Kd^* d/d\text{angle}(\Delta\text{angle})$$

$$\text{scale new} = \text{scale} + K^* \Delta\text{scale} + Ki^* \int \Delta\text{scale} + Kd^* d/d\text{scale}(\Delta\text{scale}).$$

FIG. 6 is a flowchart of a particular method 600 of determining appropriate K, Ki and Kd values. It is noted that other methods of determining appropriate K, Ki and Kd values are possible. It is further noted that the steps in FIG. 6 may occur concurrently or in a different order.

In step 602, appropriate values of K, Ki and Kd may be found by first receiving initial estimates of K, Ki and Kd. The reference image 310 may then be rotated, shifted and scaled producing a pseudo input image using a known affine transformation in step 604. The pseudo image may then be treated as the above mentioned input image 320 in step 606.

Consequently, image registration may be performed in step 608 between the reference image 310 and the pseudo input image using PID control techniques as discussed in the above mentioned PID controlled process 500. That is, the estimate matrix, ρ 360, may be constructed comprising initial estimates of at least one of a position, angle and scale value of the pseudo image. The pseudo image may then be subtracted from the reference image 310, pixel by pixel, yielding an error matrix, e 340. If the error matrix, e 340, is less than a given value, then appropriate values for K, Ki and Kd have been found for that iteration. These K, Ki and Kd values are known as candidate values. If the error matrix, e 340, is not less than a given value, then the error matrix, e 340, may be multiplied with the matrices, λ 370 and ρ 360. The result of the multiplication of the error matrix, e 340, with the matrix, λ 370, and the matrix, ρ 360, may be the new change in the position, angle and scale values of the pseudo image. New values for the position, angle and scale of the pseudo image replace the former values of the position, angle and scale to transform the pseudo image. The constant values, K, Ki, and Kd, may be adjusted during each iteration of process 500 one or more times to find the actual values of the position, angle and scale of the pseudo image at a faster rate. The process of determining the actual position, angle and scale continues as in the above described PID controlled process 500 until the error matrix, e 340, is less than a given value. Hence the pseudo image will be subtracted from the reference image resulting in a new error matrix, e 340, and continuing with the process until the error matrix, e 340, is less than a given value. When the error matrix, e 340, is less than a given value, appropriate values for K, Ki and Kd have been found for that iteration. These K, Ki and Kd values are known as candidate values.

In step 610, a determination is made as to whether a new pseudo image should be created in step 612 and repeat steps 606 and 608 or whether final K, Ki and Kd values should be calculated in step 614. If the convergence rate of finding the actual position, angle and scale values of the pseudo image is deemed insufficient, then the reference image may be shifted, rotated and scaled to create a new pseudo image in step 612. Consequently, steps 606 and 608 are repeated. Step 608 may be repeated using the K, Ki and Kd values from the previously produced pseudo image which are referred to as candidate values. Step 608 may also be repeated using new initial values for K, Ki and Kd. Steps 612, 606 and 608 may be repeated one or more times until the convergence rate of finding the actual position, angle and scale values of the pseudo image is satisfactory. Once the convergence rate is deemed satisfactory, final K, Ki and Kd values are produced in step 614. Final K, Ki and Kd values may be produced from continually adjusting the candidate values of K, Ki and Kd from each iteration or a subset of iterations of steps 606, 608 and 612. Final K, Ki and Kd values may also be calculated by taking an average of the candidate K, Ki and Kd values of each iteration of steps 606, 608 and 612 instead of continually adjusting the values of K, Ki and Kd from prior candidate K, Ki and Kd values. The final K, Ki and Kd values are used in transforming the input image to approximate the reference image.

Figure 7:
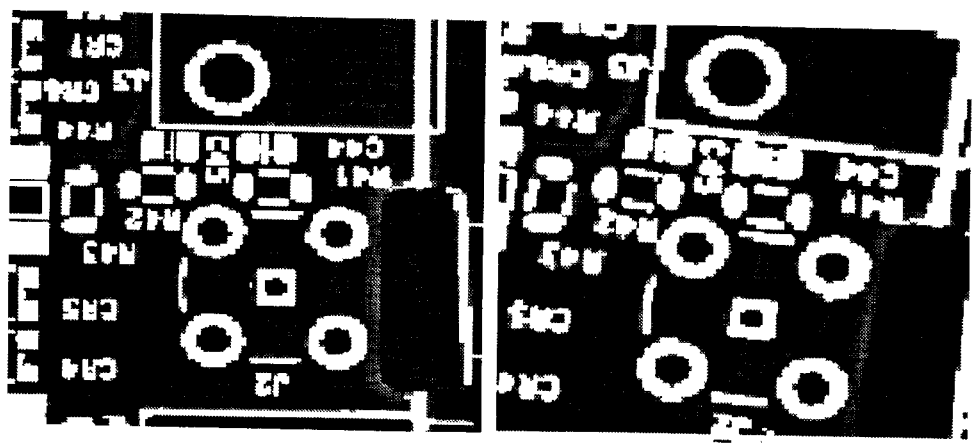
FIG. 7 illustrates a pair of images used in image registration, where (a) represents a reference image and (b) represents an input image shifted, rotated and scaled with respect to the reference image.

FIG. 7—Pair of Images Used in Image Registration

FIG. 7 shows a typical pair of images that were used for the registration experiments. In this example the image shown in FIG. 7(b) is a shifted, rotated, and scaled version of the image in FIG. 7(a). The system and method of the present invention may then be used to perform registration between the two images in FIG. 7 to determine the values x, y, θ, and s which define the difference between the two images.

Figure 8:
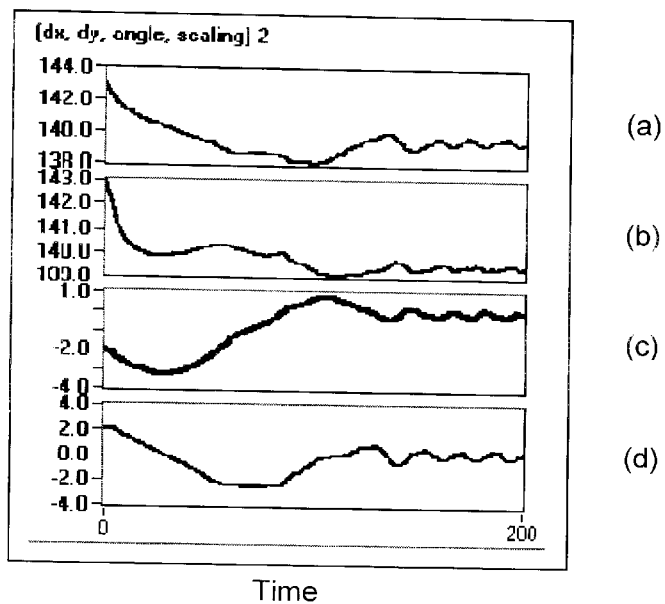
FIG. 8 is a plot of the response time of finding the exact values of position, angle and scale of the input image using a PID controller, where P has a value of 1 for each of the affine parameters to be estimated.

FIG. 8—Plot of the Response Time Using P Equal to 1

FIG. 8 depicts the response time of a control-based registration technique of the images in FIG. 7 with P equaling 1. P represents the proportional component of the PID controller. That is, P=1
Therefore, $$X\text{new} = \Delta X + Ki^* \int \Delta X + Kd^* d/dx(\Delta X)$$

$$Y\text{new} = \Delta Y + Ki^* \int \Delta Y + Kd^* d/dy(\Delta Y)$$

$$\text{angle new} = \text{angle} + \Delta\text{angle} + Ki^* \int \Delta\text{angle} + Kd^* d/d\text{angle}(\Delta\text{angle}) = \text{angle} + \Delta\text{angle}$$

$$\text{scale new} = \text{scale} + \Delta\text{scale} + Ki^* \int \Delta\text{scale} + Kd^* d/d\text{scale}(\Delta\text{scale}) = \text{scale} + \Delta\text{scale}.$$

FIG. 8(a) depicts the graph of the change in x of an input image versus time. FIG. 8(b) depicts the graph of the change in y of an input image versus time. FIG. 8(c) depicts the graph of the angle of an input image versus time. FIG. 8(d) depicts the graph of the scale of an input image versus time. Graphs of FIGS. 8(a)–(d) indicate that the registration technique with P equal to 1 is relatively slow in determining the amount of shift, rotation and scaling of the input image with respect to the reference image in comparison to FIG. 9.

Figure 9:
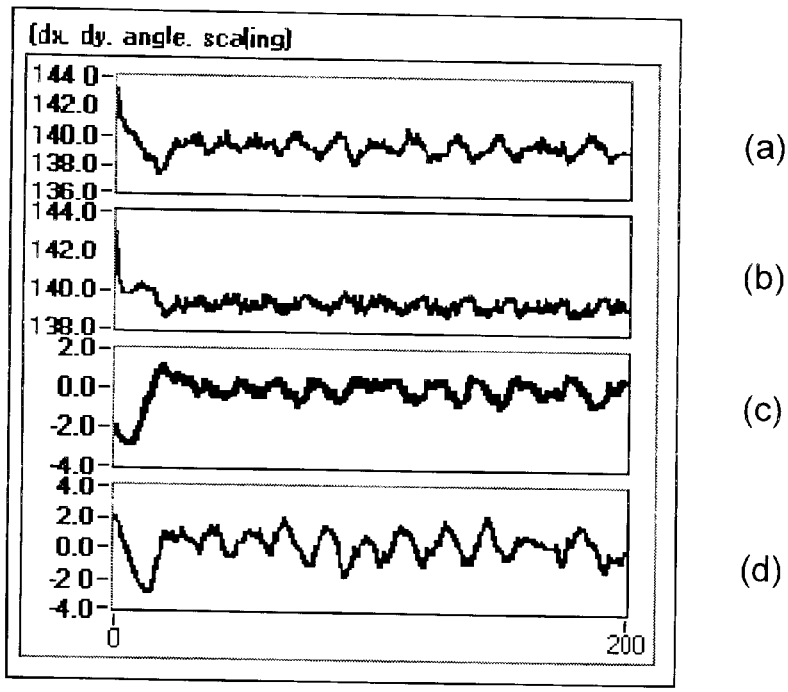
FIG. 9 is a plot of the response time of finding the exact values of position, angle and scale of the input image using a PID controller, where P has a value of 5 for each of the affine parameters to be estimated.

FIG. 9—Plot of Response Time Using P Equal to 5

FIG. 9 depicts the response time of a control-based registration technique depicted in FIG. 7 with P equaling 5. P represents the proportional component of the PID controller. That is, P=5
Therefore, $$X\text{new}=X+5*\Delta X+Ki*\int \Delta X+Kd*d/dx(\Delta X)$$

$$Y\text{new}=Y+5*\Delta Y+Ki*\int \Delta Y+Kd*d/dy(\Delta Y)$$

$$\text{angle new}=\text{angle}+5*\Delta\text{angle}+Ki*\int \Delta\text{angle}+Kd*d/d\text{angle}(\Delta\text{angle})=\text{angle}+5\Delta\text{angle}$$

$$\text{scale new}=\text{scale}+5*\Delta\text{scale}+Ki*\int \Delta\text{scale}+Kd*d/d\text{scale}(\Delta\text{scale})=\text{scale}+5\Delta\text{scale}.$$

FIG. 9(a) depicts the graph of the change in x of an input image versus time. FIG. 9(b) depicts the graph of the change in y of an input image versus time. FIG. 9(c) depicts the graph of the angle of an input image versus time. FIG. 9(d) depicts the graph of the scale of an input image versus time. Graphs of FIGS. 9(a)–(d) indicate that the registration technique with P equal to 5 is faster in determining the amount of shift, rotation and scaling of the input image with respect to the reference image in comparison to FIG. 8. The performance is significantly better than the choice of the k-values equaling 1.

Although the system and method of the present invention is described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A method for performing image registration between an input image and a reference image, wherein the reference image comprises a first plurality of pixels, the method comprising:
   receiving the input image, wherein the input image comprises a second plurality of pixels, wherein the input image differs from the reference image by one or more of position, angle and scale;
   transforming the input image to approximate the reference image, wherein said transforming the input image uses PID control techniques, wherein said transforming produces a new input image;
   calculating a difference between the new input image and the reference image, resulting in an error;
   wherein said transforming the input image and said calculating the difference are performed one or more times until the error is less than a given value; and
   generating an estimate in response to said transforming and said calculating the difference, wherein the estimate comprises at least one of a position value, an angle value and a scale value which defines an affine transformation of the input image with respect to the reference image.

2. The method of image registration as recited in claim 1, wherein said transforming the input image includes transforming one or more of position, angle, and scale of the input image using PID control techniques.

3. The method of image registration as recited in claim 1, wherein said transforming the input image using PID control techniques uses a steady state error correction parameter to reduce steady state errors and a response parameter to increase response times.

4. The method of image registration as recited in claim 1, wherein said transforming the input image using PID control techniques uses an integration parameter to reduce steady state errors and a derivative parameter to increase response times.

5. The method of image registration as recited in claim 1, wherein said transforming the input image using PID control techniques includes transforming a position of the input image, wherein said transforming the position of the input image uses the equations:

$$X\text{new}=X+K*\Delta X+Ki*\int \Delta X+Kd*d/dx(\Delta X)$$

$$Y\text{new}=Y+K*\Delta Y+Ki*\int \Delta Y+Kd*d/dy(\Delta Y)$$

wherein K is a constant, Ki is an integral constant and Kd is a derivative constant;
   wherein X and Y refer to the x and y position, respectively, of the input image, wherein ΔX is a change in the value X of the input image, wherein ΔY is a change in the value Y of the input image, wherein Xnew refers to the new value of the position X of the input image, wherein Ynew refers to the new value of the position Y of the input image.

6. The method of image registration as recited in claim 1, wherein said transforming the input image using PID control techniques includes transforming an angle of the input image, wherein said transforming the angle of the input image uses the equations:

$$\text{angle new}=\text{angle}+K*\Delta\text{angle}+Ki*\int \Delta\text{angle}+Kd*d/d\text{angle}(\Delta\text{angle})$$

wherein K is a constant, Ki is an integral constant and Kd is a derivative constant;
   wherein "angle" refers to the angle of the input image, wherein "Δangle" refers to a change in the value of the angle of the input image, wherein "angle new" refers to the new value for the angle of the input image.

7. The method of image registration as recited in claim 1, wherein said transforming the input image using PID control techniques includes transforming a scale of the input image, wherein said transforming the scale of the input image uses the equations:

$$\text{scale new}=\text{scale}+K*\Delta\text{scale}+Ki*\int \Delta\text{scale}+Kd*d/d\text{scale}(\Delta\text{scale})$$

wherein K is a constant, Ki is an integral constant and Kd is a derivative constant;
   wherein "scale" refers to said scale of said input image, wherein "Δscale" refers to a change in the value of the scale of the input image, wherein "scale new" refers to the new value for the scale of the input image.

8. The method of image registration as recited in claim 1, wherein said transforming the input image using PID control techniques includes transforming a position, angle and scale of the input image, wherein said transforming the position, angle and scale of the input image uses the equations:

$$X\text{new}=X+K*\Delta X+Ki*\int \Delta X+Kd*d/dx(\Delta X)$$

$$Y\text{new}=Y+K*\Delta Y+Ki*\int \Delta Y+Kd*d/dy(\Delta Y)$$

$$\text{angle new}=\text{angle}+K*\Delta\text{angle}+Ki*\int \Delta\text{angle}+Kd*d/d\text{angle}(\Delta\text{angle})$$

$$\text{scale new}=\text{scale}+K*\Delta\text{scale}+Ki*\int \Delta\text{scale}+Kd*d/d\text{scale}(\Delta\text{scale})$$

wherein K is a constant, Ki is an integral constant and Kd is a derivative constant;

wherein X and Y refer to the x and y position, respectively, of the input image, wherein ΔX is a change in the value X of the input image, wherein ΔY is a change in the value Y of the input image, wherein Xnew refers to the new value of the position X of the input image, wherein Ynew refers to the new value of the position Y of the input image;

wherein "angle" refers to the angle of the input image, wherein "Δangle" refers to a change in the value of the angle of the input image, wherein "angle new" refers to the new value for the angle of the input image;

wherein "scale" refers to said scale of said input image, wherein "Δscale" refers to a change in the value of the scale of the input image, wherein "scale new" refers to the new value for the scale of the input image.

9. The method of image registration as recited in claim 8, further comprising:

generating the values K, Ki and Kd, wherein said generating the values K, Ki and Kd comprises:
receiving initial estimates of K, Ki and Kd;
adjusting the reference image to create a current pseudo input image using a known affine transformation;
performing image registration between the reference image and the pseudo input image using PID control techniques, wherein the image registration uses values for K, Ki and Kd, wherein said performing image registration includes adjusting K, Ki and Kd one or more times to produce final K, Ki and Kd values;
wherein the final K, Ki and Kd values are used in said transforming the input image to approximate the reference image.

10. The method of image registration as recited in claim 1, wherein said transforming the input image using PID control techniques uses a constant K, an integration parameter Ki to reduce steady state errors and a derivative parameter Kd to increase response times.

11. The method of image registration as recited in claim 10, the method further comprising:

generating the values K, Ki and Kd, wherein said generating the values K, Ki and Kd comprises:
receiving initial estimates of K, Ki and Kd;
adjusting the reference image to create a current pseudo input image using a known affine transformation;
performing image registration between the reference image and the pseudo input image using PID control techniques, wherein the image registration uses values for K, Ki and Kd, wherein said performing image registration includes adjusting K, Ki and Kd one or more times to produce final K, Ki and Kd values;
wherein the final K, Ki and Kd values are used in said transforming the input image to approximate the reference image.

12. The method of image registration as recited in claim 10, further comprising:

generating the values K, Ki and Kd, wherein said generating the values K, Ki and Kd comprises:
receiving initial estimates of K, Ki and Kd;
adjusting the reference image to create a current pseudo input image using a known affine transformation;
performing image registration between the reference image and the pseudo input image using PID control techniques, wherein the image registration is performed one or more times, wherein the image registration uses the initial estimates for K, Ki and Kd, wherein said performing image registration includes adjusting K, Ki and Kd one or more times to produce candidate K, Ki and Kd values;
wherein said steps of receiving initial estimates, adjusting, and performing are performed one or more times to produce one or more candidate K, Ki and Kd values, wherein the one or more candidate K, Ki and Kd values are used to produce final K, Ki and Kd values;
wherein the final K, Ki and Kd values are used in said transforming the input image to approximate the reference image.

13. The method as recited in claim 12,
wherein said steps of receiving initial estimates, adjusting, and performing are performed one or more times to produce a plurality of candidate K, Ki and Kd values;
the method further comprising averaging the plurality of candidate K, Ki and Kd values to produce the final K, Ki and Kd values.

14. The method as recited in claim 12,
wherein, for at least a subset of iterations of said steps of receiving initial estimates, adjusting, and performing, the initial estimates comprise candidate K, Ki and Kd values from prior iterations.

15. The method as recited in claim 1,
wherein said calculating the difference between the new input image and the reference image results in a current error;
the method further comprising updating a current estimate after said transforming;
wherein said transforming includes transforming the input image using the current error and the current estimate to approximate the reference image.

16. The method as recited in claim 15, wherein the reference image is represented by a representation;
wherein the representation represents features of the reference image;
wherein said transforming includes transforming the input image using the representation to approximate the reference image.

17. The method as recited in claim 1, wherein the reference image is represented by a representation;
wherein the representation represents features of the reference image;
wherein said transforming includes transforming the input image using the representation to approximate the reference image.

18. The method as recited in claim 17, wherein the representation represents a subset of the pixels of the reference image.

19. The method as recited in claim 17, wherein the representation represents a gradient of the reference image.

20. The method as recited in claim 1, wherein the input image is positioned on a stage;
wherein said transforming said input image comprises rotating the stage to change an orientation of the input image.

21. A method for performing image registration between an input image and a reference image, wherein the reference image comprises a first plurality of pixels, the method comprising:

a) receiving the input image, wherein the image comprises a second plurality of pixels, wherein the input image differs from the reference image by one or more of position, angle and scale;

b) generating a current error which represent a difference between the input image and the reference image;

c) wherein, if the current error is not less than a given value, then:

c1) transforming the input image using the current error and a current estimate, wherein the current estimate comprises at least one of an angle value and a scale value of the input image, wherein said transforming produces a new input image;

c2) updating the current estimate;

c3) generating a new current error between the new input image and the reference image;

d) wherein said transforming the input image and said generating the new current error are performed one or more times until the current error is less than the given value; and wherein, when the current error is less than the given value, the current estimate comprises at least one of an angle value and a scale value which defines an affine transformation of the input image with respect to the reference image.

22. The method of image registration as recited in claim 21, wherein said transforming the input image includes transforming one or more of position, angle, and scale of the input image using PID control techniques.

23. The method of image registration as recited in claim 21, wherein said transforming the input image using PID control techniques uses a steady state error correction parameter to reduce steady state errors and a response parameter to increase response times.

24. The method of image registration as recited in claim 21, wherein said transforming the input image using PID control techniques uses an integration parameter to reduce steady state errors and a derivative parameter to increase response times.

25. The method of image registration as recited in claim 21, wherein said transforming the input image using PID control techniques includes transforming a position of the input image, wherein said transforming the position of the input image uses the equations:

$$X\text{new}=X+K^*\Delta X+Ki^*\int \Delta X+Kd^*d/dx(\Delta X)$$

$$Y\text{new}=Y+K^*\Delta Y+Ki^*\int \Delta Y+Kd^*d/dy(\Delta Y)$$

wherein K is a constant, Ki is an integral constant and Kd is a derivative constant;

wherein X and Y refer to the x and y position, respectively, of the input image, wherein $\Delta X$ is a change in the value X of the input image, wherein $\Delta Y$ is a change in the value Y of the input image, wherein Xnew refers to the new value of the position X of the input image, wherein Ynew refers to the new value of the position Y of the input image.

26. The method of image registration as recited in claim 21, wherein said transforming the input image using PID control techniques includes transforming an angle of the input image, wherein said transforming the angle of the input image uses the equations:

$$\text{angle new}=\text{angle}+K^*\Delta\text{angle}+Ki^*\int \Delta\text{angle}+Kd^*d/d\text{angle}(\Delta\text{angle})$$

wherein K is a constant, Ki is an integral constant and Kd is a derivative constant;

wherein "angle" refers to the angle of the input image, wherein "$\Delta$angle" refers to a change in the value of the angle of the input image, wherein "angle new" refers to the new value for the angle of the input image.

27. The method of image registration as recited in claim 21, wherein said transforming the input image using PID control techniques includes transforming a scale of the input image, wherein said transforming the scale of the input image uses the equations:

$$\text{scale new}=\text{scale}+K^*\Delta\text{scale}+Ki^*\int \Delta\text{scale}+Kd^*d/d\text{scale}(\Delta\text{scale})$$

wherein K is a constant, Ki is an integral constant and Kd is a derivative constant;

wherein "scale" refers to said scale of said input image, wherein "$\Delta$scale" refers to a change in the value of the scale of the input image, wherein "scale new" refers to the new value for the scale of the input image.

28. The method of image registration as recited in claim 21, wherein said transforming the input image using PID control techniques includes transforming a position, angle and scale of the input image, wherein said transforming the position, angle and scale of the input image uses the equations:

$$X\text{new}=X+K^*\Delta X+Ki^*\int \Delta X+Kd^*d/dx(\Delta X)$$

$$Y\text{new}=Y+K^*\Delta Y+Ki^*\int \Delta Y+Kd^*d/dy(\Delta Y)$$

$$\text{angle new}=\text{angle}+K^*\Delta\text{angle}+Ki^*\int \Delta\text{angle}+Kd^*d/d\text{angle}(\Delta\text{angle})$$

$$\text{scale new}=\text{scale}+K^*\Delta\text{scale}+Ki^*\int \Delta\text{scale}+Kd^*d/d\text{scale}(\Delta\text{scale})$$

wherein K is a constant, Ki is an integral constant and Kd is a derivative constant;

wherein X and Y refer to the x and y position, respectively, of the input image, wherein $\Delta X$ is a change in the value X of the input image, wherein $\Delta Y$ is a change in the value Y of the input image, wherein Xnew refers to the new value of the position X of the input image, wherein Ynew refers to the new value of the position Y of the input image;

wherein "angle" refers to the angle of the input image, wherein "$\Delta$angle" refers to a change in the value of the angle of the input image, wherein "angle new" refers to the new value for the angle of the input image;

wherein "scale" refers to said scale of said input image, wherein "$\Delta$scale" refers to a change in the value of the scale of the input image, wherein "scale new" refers to the new value for the scale of the input image.

29. The method of image registration as recited in claim 28, further comprising:

generating the values K, Ki and Kd, wherein said generating the values K, Ki and Kd comprises:

receiving initial estimates of K, Ki and Kd;

adjusting the reference image to create a current pseudo input image using a known affine transformation;

performing image registration between the reference image and the pseudo input image using PID control techniques, wherein the image registration uses values for K, Ki and Kd, wherein said performing image registration includes adjusting K, Ki and Kd one or more times to produce final K, Ki and Kd values;

wherein the final K, Ki and Kd values are used in said transforming the input image to approximate the reference image.

30. The method of image registration as recited in claim 21, wherein said transforming the input image using PID control techniques uses a constant K, an integration parameter Ki to reduce steady state errors and a derivative parameter Kd to increase response times.

31. The method of image registration as recited in claim 30, the method further comprising:

generating the values K, Ki and Kd, wherein said generating the values K, Ki and Kd comprises:
receiving initial estimates of K, Ki and Kd;
adjusting the reference image to create a current pseudo input image using a known affine transformation;
performing image registration between the reference image and the pseudo input image using PID control techniques, wherein the image registration uses values for K, Ki and Kd, wherein said performing image registration includes adjusting K, Ki and Kd one or more times to produce final K, Ki and Kd values;
wherein the final K, Ki and Kd values are used in said transforming the input image to approximate the reference image.

32. The method of image registration as recited in claim 30, further comprising:
generating the values K, Ki and Kd, wherein said generating the values K, Ki and Kd comprises:
receiving initial estimates of K, Ki and Kd;
adjusting the reference image to create a current pseudo input image using a known affine transformation;
performing image registration between the reference image and the pseudo input image using PID control techniques, wherein the image registration is performed one or more times, wherein the image registration uses the initial estimates for K, Ki and Kd, wherein said performing image registration includes adjusting K, Ki and Kd one or more times to produce candidate K, Ki and Kd values;
wherein said steps of receiving initial estimates, adjusting, and performing are performed one or more times to produce one or more candidate K, Ki and Kd values, wherein the one or more candidate K, Ki and Kd values are used to produce final K, Ki and Kd values;
wherein the final K, Ki and Kd values are used in said transforming the input image to approximate the reference image.

33. The method as recited in claim 32,
wherein said steps of receiving initial estimates, adjusting, and performing are performed one or more times to produce a plurality of candidate K, Ki and Kd values;
the method further comprising averaging the plurality of candidate K, Ki and Kd values to produce the final K, Ki and Kd values.

34. The method as recited in claim 32,
wherein, for at least a subset of iterations of said steps of receiving initial estimates, adjusting, and performing, the initial estimates comprise candidate K, Ki and Kd values from prior iterations.

35. The method as recited in claim 21, wherein the reference image is represented by a representation;
wherein the representation represents features of the reference image;
wherein said transforming includes transforming the input image using the representation to approximate the reference image.

36. A method for performing registration between an input array of values and a reference array of values, wherein the reference array of values comprises a first plurality of values, the method comprising:
receiving the input array of values, wherein the input array of values comprises a second plurality of values, wherein the input array differs from the reference array by one or more of position, angle and scale;
transforming the input array to approximate the reference array, wherein said transforming the input array uses PID control techniques, wherein said transforming produces a new input array;
calculating a difference between the new input array and the reference array, resulting in an error;
wherein said transforming the input array and said calculating the difference are performed one or more times until the error is less than a given value; and
generating an estimate in response to said transforming and said calculating the difference, wherein the estimate comprises at least one of a position value, an angle value and a scale value which defines an affine transformation of the input array with respect to the reference array.

37. The method of registration as recited in claim 36, wherein said transforming the input array includes transforming one or more of position, angle, and scale of the input array using PID control techniques.

38. The method of registration as recited in claim 36, wherein said transforming the input array using PID control techniques uses a steady state error correction parameter to reduce steady state errors and a response parameter to increase response times.

39. The method of registration as recited in claim 36, wherein said transforming the input array using PID control techniques includes transforming a position, angle and scale of the input array, wherein said transforming the position, angle and scale of the input array comprises:

$$X\text{new} = X + K^*\Delta X + Ki^* \int \Delta X + Kd^* d/dx(\Delta X)$$

$$Y\text{new} = Y + K^*\Delta Y + Ki^* \int \Delta Y + Kd^* d/dy(\Delta Y)$$

$$\text{angle new} = \text{angle} + K^*\Delta\text{angle} + Ki^* \int \Delta\text{angle} + Kd^* d/d\text{angle}(\Delta\text{angle})$$

$$\text{scale new} = \text{scale} + K^*\Delta\text{scale} + Ki^* \int \Delta\text{scale} + Kd^* d/d\text{scale}(\Delta\text{scale})$$

wherein K is a constant, Ki is an integral constant and Kd is a derivative constant;
wherein X and Y refer to the x and y position, respectively, of the input array, wherein $\Delta X$ is a change in the value X of the input array, wherein $\Delta Y$ is a change in the value Y of the input array, wherein Xnew refers to the new value of the position X of the input array, wherein Ynew refers to the new value of the position Y of the input array;
wherein "angle" refers to the angle of the input array, wherein "$\Delta$angle" refers to a change in the value of the angle of the input array, wherein "angle new" refers to the new value for the angle of the input array;
wherein "scale" refers to said scale of said input array, wherein "$\Delta$scale" refers to a change in the value of the scale of the input array, wherein "scale new" refers to the new value for the scale of the input array.

40. The method of registration as recited in claim 36, wherein the input array of values and the reference array of values comprise pixels.

41. The method of registration as recited in claim 36, wherein the values of the input image and the reference image are sensor values.

42. A system for performing image registration between an input image and a reference image, the system comprising:
a CPU;
a memory coupled to the CPU for storing the reference image, wherein the reference image comprises a first plurality of pixels,
an input for receiving the input image, wherein the input image comprises a second plurality of pixels, wherein the input image differs from the reference image by one or more of position, angle and scale;

wherein the memory is operable to store the input image;

wherein the memory also stores an image registration program which is executable by the CPU to perform image registration between the input image and the reference image;

wherein the image registration program is executable to:
transform the input image to approximate the reference image, wherein said transforming the input image uses PID control techniques, wherein said transforming produces a new input image;

calculate a difference between the new input image and the reference image, resulting in an error;

wherein the image registration program is executable to transform the input image and calculate the difference one or more times until the error is less than a given value; and generate an estimate in response to said transforming and said calculating the difference, wherein the estimate comprises at least one of a position value, an angle value and a scale value which defines an affine transformation of the input image with respect to the reference image.

43. The system for performing image registration as recited in claim 42, wherein said transforming the input image includes transforming one or more of position, angle, and scale of the input image using PID control techniques.

44. The system for performing image registration as recited in claim 42, wherein said transforming the input image using PID control techniques uses a steady state error correction parameter to reduce steady state errors and a response parameter to increase response times.

45. The system for performing image registration as recited in claim 42, wherein, in transforming the input image, the image registration program is executable to use PID control techniques to transform a position of the input image, wherein, in transforming the position of the input image, the image registration program is executable to use the equations:

$$X\text{new}=X+K^*\Delta X+Ki^*\int \Delta X+Kd^*d/dx(\Delta X)$$

$$Y\text{new}=Y+K^*\Delta Y+Ki^*\int \Delta Y+Kd^*d/dy(\Delta Y)$$

wherein K is a constant, Ki is an integral constant and Kd is a derivative constant;

wherein X and Y refer to the x and y position, respectively, of the input image, wherein $\Delta X$ is a change in the value X of the input image, wherein $\Delta Y$ is a change in the value Y of the input image, wherein Xnew refers to the new value of the position X of the input image, wherein Ynew refers to the new value of the position Y of the input image.

46. The system for performing image registration as recited in claim 42, wherein, in transforming the input image, the image registration program is executable to use PID control techniques to transform an angle of the input image, wherein, in transforming the angle of the input image, the image registration program is executable to use the equation:

$$\text{angle new}=\text{angle}+K^*\Delta\text{angle}+Ki^*\int \Delta\text{angle}+Kd^*d/d\text{angle}(\Delta\text{angle})$$

wherein K is a constant, Ki is an integral constant and Kd is a derivative constant;

wherein "angle" refers to the angle of the input image, wherein "$\Delta$angle" refers to a change in the value of the angle of the input image, wherein "angle new" refers to the new value for the angle of the input image.

47. The system for performing image registration as recited in claim 42, wherein, in transforming the input image, the image registration program is executable to use PID control techniques to transform a scale of the input image, wherein, in transforming the scale of the input image, the image registration program is executable to use the equation:

$$\text{scale new}=\text{scale}+K^*\Delta\text{scale}+Ki^*\int \Delta\text{scale}+Kd^*d/d\text{scale}(\Delta\text{scale})$$

wherein K is a constant, Ki is an integral constant and Kd is a derivative constant;

wherein "scale" refers to said scale of said input image, wherein "$\Delta$scale" refers to a change in the value of the scale of the input image, wherein "scale new" refers to the new value for the scale of the input image.

48. The system for performing image registration as recited in claim 42, wherein, in transforming the input image, the image registration program is executable to use PID control techniques to transform the position, angle, and scale of the input image, wherein, in transforming the position, angle, and scale of the input image, the image registration program is executable to use the equations:

$$X\text{new}=X+K^*\Delta X+Ki^*\int \Delta X+Kd^*d/dx(\Delta X)$$

$$Y\text{new}=Y+K^*\Delta Y+Ki^*\int \Delta Y+Kd^*d/dy(\Delta Y)$$

$$\text{angle new}=\text{angle}+K^*\Delta\text{angle}+Ki^*\int \Delta\text{angle}+Kd^*d/d\text{angle}(\Delta\text{angle})$$

$$\text{scale new}=\text{scale}+K^*\Delta\text{scale}+Ki^*\int \Delta\text{scale}+Kd^*d/d\text{scale}(\Delta\text{scale})$$

wherein K is a constant, Ki is an integral constant and Kd is a derivative constant;

wherein X and Y refer to the x and y position, respectively, of the input image, wherein $\Delta X$ is a change in the value X of the input image, wherein $\Delta Y$ is a change in the value Y of the input image, wherein Xnew refers to the new value of the position X of the input image, wherein Ynew refers to the new value of the position Y of the input image;

wherein "angle" refers to the angle of the input image, wherein "$\Delta$angle" refers to a change in the value of the angle of the input image, wherein "angle new" refers to the new value for the angle of the input image;

wherein "scale" refers to said scale of said input image, wherein "$\Delta$scale" refers to a change in the value of the scale of the input image, wherein "scale new" refers to the new value for the scale of the input image.

49. The system for performing image registration as recited in claim 48, wherein the image registration program is further executable to generate the values K, Ki and Kd, wherein, in generating the values K, Ki and Kd, the image registration program is executable to:

receive initial estimates of K, Ki and Kd;

adjust the reference image to create a current pseudo input image using a known affine transformation;

perform image registration between the reference image and the pseudo input image using PID control techniques, wherein the image registration uses values for K, Ki and Kd, wherein said performing image registration includes adjusting K, Ki and Kd one or more times to produce final K, Ki and Kd values;

wherein the final K, Ki and Kd values are used in transforming the input image to approximate the reference image.

50. The system for performing image registration as recited in claim 42, wherein the system comprises a computer system coupled to an image acquisition device, wherein the computer system includes the CPU and the memory.

51. A system for performing image registration between an input image and a reference image, the system comprising:
- a memory for storing the reference image, wherein the reference image comprises a first plurality of pixels;
- an input for receiving an input image, wherein the input image comprises a second plurality of pixels, wherein the input image differs from the reference image by one or more of position, angle and scale;
- wherein the memory is operable to store the input image;
- a transformer coupled to the memory for transforming the input image to approximate the reference image, wherein the transformer uses PID control techniques in transforming the input image, wherein the transformer produces a new input image;
- a difference generator coupled to the transformer for calculating a difference between the new input image and the reference image, resulting in an error;
- wherein the transformer and the difference generator operate one or more times until the error is less than a given value; and
- an estimator coupled to the transformer and the difference generator for generating an estimate in response to the transformer and the difference generator, wherein the estimate comprises at least one of a position value, an angle value and a scale value which defines an affine transformation of the input image with respect to the reference image.

52. A system for performing image registration between an input image and a reference image, wherein the reference image comprises a first plurality of pixels, the system comprising:
- an input for receiving the input image, wherein the input image comprises a second plurality of pixels, wherein the input image differs from the reference image by one or more of position, angle and scale;
- means for transforming the input image to approximate the reference image, wherein said transforming the input image uses PID control techniques, wherein said transforming produces a new input image;
- means for calculating a difference between the new input image and the reference image, resulting in an error;
- wherein said means for transforming the input image and said means for calculating the difference operate one or more times until the error is less than a given value; and
- means for generating an estimate in response to said transforming and said calculating the difference, wherein the estimate comprises at least one of a position value, an angle value and a scale value which defines an affine transformation of the input image with respect to the reference image.

53. A memory medium comprising program instructions for performing image registration between an input image and a reference image, wherein the reference image comprises a first plurality of pixels, wherein the input image comprises a second plurality of pixels, wherein the input image differs from the reference image by one or more of position, angle and scale, wherein the program instructions are executable to implement:
- transforming the input image to approximate the reference image, wherein said transforming the input image uses PID control techniques, wherein said transforming produces a new input image;
- calculating a difference between the new input image and the reference image, resulting in an error;
- wherein said transforming the input image and said calculating the difference are performed one or more times until the error is less than a given value; and
- generating an estimate in response to said transforming and said calculating the difference, wherein the estimate comprises at least one of a position value, an angle value and a scale value which defines an affine transformation of the input image with respect to the reference image.

54. The memory medium as recited in claim 53, wherein said transforming the input image includes transforming one or more of position, angle, and scale of the input image using PID control techniques.

55. The memory medium as recited in claim 53, wherein said transforming the input image using PID control techniques uses a steady state error correction parameter to reduce steady state errors and a response parameter to increase response times.

56. The memory medium as recited in claim 53, wherein said transforming the input image using PID control techniques uses an integration parameter to reduce steady state errors and a derivative parameter to increase response times.

57. The memory medium as recited in claim 53, wherein said transforming the input image using PID control techniques includes transforming a position, angle and scale of the input image, wherein said transforming the position, angle and scale of the input image uses the equations:

$$X\text{new} = X + K^*\Delta X + Ki^* \int \Delta X + Kd^* d/dx(\Delta X)$$

$$Y\text{new} = Y + K^*\Delta Y + Ki^* \int \Delta Y + Kd^* d/dy(\Delta Y)$$

$$\text{angle new} = \text{angle} + K^*\Delta\text{angle} + Ki^* \int \Delta\text{angle} + Kd^* d/d\text{angle}(\Delta\text{angle})$$

$$\text{scale new} = \text{scale} + K^*\Delta\text{scale} + Ki^* \int \Delta\text{scale} + Kd^* d/d\text{scale}(\Delta\text{scale})$$

wherein K is a constant, Ki is an integral constant and Kd is a derivative constant;
- wherein X and Y refer to the x and y position, respectively, of the input image, wherein $\Delta X$ is a change in the value X of the input image, wherein $\Delta Y$ is a change in the value Y of the input image, wherein Xnew refers to the new value of the position X of the input image, wherein Ynew refers to the new value of the position Y of the input image;
- wherein "angle" refers to the angle of the input image, wherein "$\Delta$angle" refers to a change in the value of the angle of the input image, wherein "angle new" refers to the new value for the angle of the input image;
- wherein "scale" refers to said scale of said input image, wherein "$\Delta$scale" refers to a change in the value of the scale of the input image, wherein "scale new" refers to the new value for the scale of the input image.

58. The memory medium as recited in claim 57, wherein the program instructions are further executable to implement:
- generating the values K, Ki and Kd, wherein said generating the values K, Ki and Kd comprises:
- receiving initial estimates of K, Ki and Kd;
- adjusting the reference image to create a current pseudo input image using a known affine transformation;

performing image registration between the reference image and the pseudo input image using PID control techniques, wherein the image registration uses values for K, Ki and Kd, wherein said performing image registration includes adjusting K, Ki and Kd one or more times to produce final K, Ki and Kd values; wherein the final K, Ki and Kd values are used in said transforming the input image to approximate the reference image.

* * * * *